(12) United States Patent
Tang

(10) Patent No.: US 11,405,416 B2
(45) Date of Patent: Aug. 2, 2022

(54) METHOD AND DEVICE FOR IDENTIFYING SECURITY THREATS, STORAGE MEDIUM, PROCESSOR AND TERMINAL

(71) Applicant: Siemens Ltd., China, Beijing (CN)

(72) Inventor: Wen Tang, Beijing (CN)

(73) Assignee: SIEMENS LTD., CHINA, Beijing (CN)

( * ) Notice: Subject to any disclaimer, the term of this patent is extended or adjusted under 35 U.S.C. 154(b) by 201 days.

(21) Appl. No.: 16/567,713

(22) Filed: Sep. 11, 2019

(65) Prior Publication Data
US 2020/0084235 A1    Mar. 12, 2020

(30) Foreign Application Priority Data

Sep. 12, 2018  (CN) .......................... 201811061492.X

(51) Int. Cl.
*H04L 9/40* (2022.01)

(52) U.S. Cl.
CPC ........ *H04L 63/1441* (2013.01); *H04L 63/105* (2013.01); *H04L 63/1416* (2013.01); *H04L 63/1433* (2013.01)

(58) Field of Classification Search
CPC ............... H04L 63/1441; H04L 63/105; H04L 63/1416; H04L 63/1433
See application file for complete search history.

(56) References Cited

U.S. PATENT DOCUMENTS

| 7,530,105 B2 * | 5/2009 | Gilbert | G06F 21/55 709/222 |
| 8,799,462 B2 * | 8/2014 | McHugh | G06F 21/577 709/224 |
| 8,925,076 B2 * | 12/2014 | Zaitsev | G06F 21/554 726/22 |

(Continued)

FOREIGN PATENT DOCUMENTS

| CN | 102377740 A | 3/2012 |
| CN | 102638458 A | 8/2012 |

(Continued)

OTHER PUBLICATIONS

Xiaoyu Fu et al: "Digging Deeper into Cluster System Logs for Failure Prediction and Root Cause Diagnosis"; pp. 103-112; XP032691894; DOI: 10.1109/CLUSTER.2014.6988768; 2014.

(Continued)

*Primary Examiner* — Joseph P Hirl
*Assistant Examiner* — Stephen T Gundry
(74) *Attorney, Agent, or Firm* — Harness, Dickey & Pierce, P.L.C.

(57) ABSTRACT

A method, device, storage medium, processor and terminal are for identifying security threats. In an embodiment, the method includes collecting a plurality of security-related security events, each security event containing a plurality of fields; for a first security event of the plurality of security events, searching one or more second security events related to the first security event from the plurality of security events according to one or more fields of the plurality of fields of (Continued)

the first security event, one or more second security events and the first security event forming event graphs; calculating the weights of the event graphs; and sorting the event graphs according to the weights.

15 Claims, 4 Drawing Sheets

(56) References Cited

U.S. PATENT DOCUMENTS

| | | | |
|---|---|---|---|
| 10,530,805 B1* | 1/2020 | Tamersoy | H04L 63/1408 |
| 10,673,880 B1* | 6/2020 | Pratt | H04L 63/1433 |
| 10,986,117 B1* | 4/2021 | Agbabian | G06F 21/6218 |
| 2005/0193430 A1* | 9/2005 | Cohen | G06F 21/577 |
| | | | 726/25 |
| 2006/0026688 A1* | 2/2006 | Shah | H04L 41/28 |
| | | | 726/25 |
| 2006/0070127 A1* | 3/2006 | Friedlander | G16H 10/60 |
| | | | 726/22 |
| 2007/0067847 A1* | 3/2007 | Wiemer | H04L 63/1433 |
| | | | 726/25 |
| 2009/0077666 A1* | 3/2009 | Chen | G06Q 10/0631 |
| | | | 726/25 |
| 2012/0023324 A1* | 1/2012 | Sorensen | H04L 63/1416 |
| | | | 713/151 |
| 2012/0023576 A1* | 1/2012 | Sorensen | G06F 21/70 |
| | | | 726/22 |
| 2012/0066763 A1* | 3/2012 | McHugh | H04L 63/20 |
| | | | 726/22 |
| 2013/0318604 A1* | 11/2013 | Coates | G06F 16/285 |
| | | | 726/22 |
| 2015/0244734 A1* | 8/2015 | Olson | G06F 21/577 |
| | | | 726/25 |
| 2016/0028758 A1 | 1/2016 | Ellis et al. | |
| 2016/0253232 A1* | 9/2016 | Puri | G06F 21/552 |
| | | | 714/37 |
| 2017/0098087 A1* | 4/2017 | Li | H04L 63/1433 |
| 2018/0091311 A1 | 3/2018 | Kisley et al. | |
| 2019/0141058 A1* | 5/2019 | Hassanzadeh | H04L 63/0227 |
| 2019/0236661 A1* | 8/2019 | Hogg | H04L 63/1433 |
| 2019/0281010 A1* | 9/2019 | Teverovsky | H04L 63/1416 |
| 2020/0014718 A1* | 1/2020 | Joseph Durairaj | H04L 41/22 |
| 2020/0019874 A1* | 1/2020 | Poirel | H04L 63/1425 |
| 2020/0028857 A1* | 1/2020 | Warmenhoven | H04L 51/30 |
| 2020/0065483 A1* | 2/2020 | Mu | G06F 21/554 |
| 2021/0021614 A1* | 1/2021 | Shahbaz | H04L 63/1416 |
| 2021/0194909 A1* | 6/2021 | Tang | H04L 63/20 |

FOREIGN PATENT DOCUMENTS

| | | |
|---|---|---|
| CN | 105471882 A | 4/2016 |
| CN | 107517216 A | 12/2017 |
| CN | 108337270 A | 7/2018 |
| CN | 108494727 A | 9/2018 |

OTHER PUBLICATIONS

Extended European Search Report dated Jan. 8, 2020.
Office Action for Chinese Patent Application No. 201811061492.X dated Aug. 3, 2021.
Xiaoyu, Fu et al: "Digging Deeper into Cluster System Logs for Failure Prediction and Root Cause Diagnosis"; 2004 IEEE International Conference on Cluster Computing (Cluster); pp. 103-112.
Wei, Yong et al: "A Network Security Situational Awareness Model Based on Log Audit and Performance Correction"; vol. 32, No. 4, 15. Apr. 2009; pp. 763-772.
Fedorchenko, Andrey et al: "Correlation of security events based on the analysis of structures of event types"; 2017 9th IEEE International Conference on Intelligent Data Acquisition and Advanced Computing Systems: Techlology and Applications (IDAACS); Jan. 11, 2017.

* cited by examiner

METHOD AND DEVICE FOR IDENTIFYING SECURITY THREATS, STORAGE MEDIUM, PROCESSOR AND TERMINAL

PRIORITY STATEMENT

The present application hereby claims priority under 35 U.S.C. § 119 to Chinese patent application number CN 201811061492.X filed Sep. 12, 2018, the entire contents of which are hereby incorporated herein by reference.

FIELD

Embodiments of the invention generally relate to the field of identification of security threats in an operation environment, and in particular relates to a method and device for identifying security threats, a storage medium, a processor and a terminal.

BACKGROUND ART

The operational technology (OT) relates to the hardware and software which detect or cause changes caused by directly monitoring and/or controlling physical equipment, processes and events in an enterprise. The OT uses computers to monitor or change the physical states of systems, especially industrial control systems (ICSs), and these systems are computer-based facilities, systems and equipment and are used to remotely control and/or control key processes and physical functions. The OT has generally revealed the technical and functional differences between the traditional IT system environment and the ICS environment. The OT involves a supervisory control and data acquisition (SCADA) system, a distributed control system (DCS), a computer numeric control (CNC) system comprising computerized processing tools, and scientific equipment (for example, digital oscilloscope).

OT systems are traditionally closed systems designed to realize the production efficiency, operation efficiency and reliability, and security is not concerned. These systems rely on dedicated networks and hardware and have long been considered free from network attacks. With the development of the automatic manufacturing technology and the process control technology, the protection requirements for the computer environment of ICS/OT systems have become more and more important over the past years, however. The wide application of the information technology (IT), the evolution of the IT to an open system, the increase of the number of joint ventures, the increase of joint partners and outsourcing services, the increase of intelligent ICS equipment, the increase of connections with other equipment/software, and the increase of external connections and the rapid increase of network intrusion events will all cause the threats of network attacks to increase.

Currently, various security technologies are available, for example, intrusion detection system (IDS)/intrusion prevention system (IPS) and security information and event management (SIEM) system. As supplements to firewall or antivirus software, these technologies are used to cope with the ever-increasing network security events. However, the IDS/IPS/SIEM system has a high rate of false alarms, that is to say, a legal behavior or mode may be identified as an attack behavior or mode. Since a large number of false reports are generated in a real network environment, security engineers or analysts have to spend a lot of energy and time in verifying the falsely reported information or selectively ignoring excessive false reports, even if some true attack alarms exist in these false reports.

Owing to the scarcity of security professionals who can identify true attacks or security risks from false alarms in an operational environment (for example, ICS), this problem becomes more serious when the IDS/IPS or SIEM is applied to the operational environment.

SUMMARY

Embodiments of the present invention provide a method and device for identifying security threats, a storage medium, a processor and a terminal to at least improve upon or even solve the problem with a high rate of false reports caused when security attacks or illegal behaviors in an operational environment are identified.

According to one aspect of the embodiments of the present application, a method for identifying security threats is provided. The method comprises: collecting a plurality of security-related security events, wherein each security event contains a plurality of fields; for a first security event of the plurality of security events, searching one or more second security events related to the first security event from the plurality of security events according to one or more fields of the plurality of fields of the first security event, wherein one or more second security events and the first security event form event graphs; calculating the weights of the event graphs; sorting the event graphs according to the weights.

According to one aspect of the embodiments of the present application, a method for identifying security threats is provided. The method, comprises:

collecting a plurality of security-related security events, wherein each security event of the plurality of security-related security events, contains a plurality of fields;

searching, for a first security event of the plurality of security-related security events, one or more second security events related to the first security event from the plurality of security-related security events according to one or more fields of the plurality of fields of the first security event, wherein the one or more second security events and the first security event form event graphs;

calculating weights of the event graphs; and sorting the event graphs according to the weights calculated.

According to another aspect of the embodiments of the present application, a device for identifying security threats is provided. In an embodiment, the device comprises a collecting unit, used to collect a plurality of security-related security events, wherein each security event contains a plurality of fields; a searching unit, used to search one or more second security events related to the first security event from the plurality of security events according to one or more fields of the plurality of fields of the first security event for a first security event of the plurality of security events, wherein one or more second security events and the first security event form event graphs; a calculating unit, used to calculate the weights of the event graphs; a sorting unit, used to sort the event graphs according to the weights.

According to a further aspect of the present application, a storage medium is provided and is characterized in that the storage medium contains a stored program, wherein the program controls the execution of an embodiment of the above-mentioned method by the equipment where the storage medium is located when the program is run.

According to a further aspect of the present application, a non-transitory storage medium is provided, storing a stored program, the program, when run on equipment where the non-transitory storage medium is located including at least one processor, configuring the at least one processor to control execution of a method for identifying a security threat by the equipment where the non-transitory storage medium is located, the method comprising:

collecting a plurality of security-related security events, wherein each security event of the plurality of security-related security events, contains a plurality of fields;

searching, for a first security event of the plurality of security-related security events, one or more second security events related to the first security event from the plurality of security-related security events according to one or more fields of the plurality of fields of the first security event, wherein the one or more second security events and the first security event form event graphs;

calculating weights of the event graphs; and sorting the event graphs according to the weights calculated.

According to a fourth aspect of the present application, a processor is provided and is characterized in that the processor is used to run a program, wherein the program executes an embodiment of the above-mentioned method when the program is run.

According to a fifth aspect of the present application, a terminal is provided and the terminal comprises one or more processors, a storage and one or more programs, wherein one or more programs are stored in the storage and are configured to be executed by one or more processors, and one or more programs execute an embodiment of the above-mentioned method.

According to another aspect of the embodiments of the present application, a terminal for identifying security threats is provided. The terminal comprises:

one or more processors;

a storage storing one or more programs, wherein the one or more programs are executable by the one or more processors, and once executed, the one or more programs configure the one or more processors to perform at least:

collecting a plurality of security-related security events, wherein each security event of the plurality of security-related security events, contains a plurality of fields;

searching, for a first security event of the plurality of security-related security events, one or more second security events related to the first security event from the plurality of security-related security events according to one or more fields of the plurality of fields of the first security event, wherein the one or more second security events and the first security event form event graphs;

calculating weights of the event graphs; and sorting the event graphs according to the weights calculated.

According to a sixth aspect of the present application, a computer program product is provided, the computer program product is tangibly stored in a computer readable medium and comprises computer executable instructions, and at least one processor executes an embodiment of the above-mentioned method when computer executable instructions are executed.

BRIEF DESCRIPTION OF THE DRAWINGS

The drawings constitute a part of the description and are used to help further understand the present invention. The drawings illustrate the embodiments of the present invention and are used together with the description to describe the principle of the present invention. In the drawings, identical components are denoted by the same reference numeral. In the drawings.

DETAILED DESCRIPTION OF THE EXAMPLE EMBODIMENTS

Figure 1:
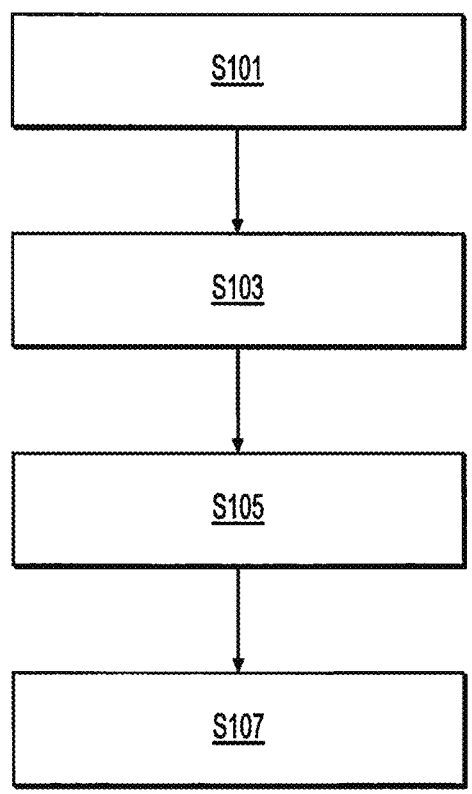
FIG. 1 shows the flowchart of the method for identifying security threats according to the embodiments of the present invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM)_, read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

According to one aspect of the embodiments of the present application, a method for identifying security threats is provided. The method comprises: collecting a plurality of security-related security events, wherein each security event contains a plurality of fields; for a first security event of the plurality of security events, searching one or more second security events related to the first security event from the plurality of security events according to one or more fields of the plurality of fields of the first security event, wherein one or more second security events and the first security event form event graphs; calculating the weights of the event graphs; sorting the event graphs according to the weights.

At least one embodiment of the present invention provides an association analysis solution which can determine the relationship between linked security events and identify the really related key behaviors to reduce the rate of false reports. The solution can provide a method of effectively monitoring the security in an operational environment to improve the security situation of the operational environment. A highly dynamic IT environment is based on interactions between human beings and therefore is highly unpredictable, while an operational environment is based on interactions between machines and therefore is determinable in essence. In the operational environment, the security alarms which are actually falsely reported are usually isolated random events. Real attacks or illegal behaviors consist of events which are linked to each other. These behaviors trigger security monitoring to generate security alarms or warnings, and meanwhile, these security events are represented by sequences or graphs of correlated security events. In the correlated event graphs, security events caused by threat behaviors consist of linked causalities. For this purpose, the present invention provides a method of associating security events into recurrent causalities of event graphs so as to identify security attacks or illegal behaviors in the operational environment and then to reduce the rate of false reports. The method according to the present invention can directly be integrated into IDS/IPS and SIEM solutions.

The method in the example embodiments of the present application further comprises converting each security event according to conversion rules so as to map a plurality of fields of each security event into one or more feature sets. Through these conversions, the fields of original security events can be processed in turn so as to make preparations for the step of searching associated events.

According to the method in the example embodiments of the present application, one or more feature sets contains context information. The plurality of fields before conversions contain no context information. The one or more feature sets after conversions performed according to conversion rules contain context information, however. The efficiency of searching associated events by use of context information is improved.

According to the method in the example embodiments of the present application, a subject-predicate-object relationship exists between a plurality of feature sets. Therefore, the plurality of feature sets have expected relationships to facilitate the association of causalities of security events in the subsequent step.

According to the method in the example embodiments of the present application, the conversion rules contains at least one of the following: directly using one or more fields as one or more feature sets, explaining one or more fields, and extracting a part of one or more fields as one or more feature sets. The conversion rules are applicable to security events containing fields of different types of information and can successfully convert these fields into a plurality of feature sets having the expected relationship.

According to the method in the example embodiments of the present application, searching one or more second security events related to a first security event from a plurality of security events according to one or more fields of a plurality of fields of the first security event comprises searching one or more second security events related to the first security event by matching one or more features in one or more feature sets of the first security event with one or more features in one or more feature sets of the second security events. Each feature of the security events after the conversion can be used as a basis for searching correlated security events in the database, and these features represent the causalities between correlated security events.

According to the method in the example embodiments of the present application, searching one or more second security events related to the first security event comprises searching one or more cause events triggering the first security event and one or more result events triggered by the first security event. Correlated events having causalities among a plurality of security events are linked together, and the searched cause events and result events and the first security event form a sequence of correlated security events or an event graph.

According to the method in the example embodiments of the present application, features include time information, subject information and object information. Among the previous or later security events, the security events which have causalities can be determined according to the information. For example, among the previous security events, if the subject information of the first security event matches the object information of the second security event, then the second security event may be the cause event causing the first security event; if the object information of the first security event matches the subject information of the second security event, then the second security event may be the result event caused by the first security event.

According to the method in the example embodiments of the present application, calculating the weights of event graphs comprises presetting a plurality of security levels, wherein each security event belongs to a security level of the plurality of security levels and a weight is assigned to each security level in order to calculate the weights of the event graphs according to the weights of the security levels of the plurality of security events. The weight of an event graph depends on the security levels of correlated security events. The larger the weights of the security levels of correlated security events are, the larger the weights of event graphs are.

According to the method in the example embodiments of the present application, calculating the weights of event graphs according to the weights of the security levels of a plurality of security events comprises calculating the weights of event graphs according to the weights of the security levels of one or more second security events. The weight of an event graph depends on the weights of the security levels of the cause event and the result event, that is to say, the larger the weights of the correlated cause event and result event are, the larger the weight of the event graph is. The larger the weight of the event graph is, the higher the probability of a security event being an attack or illegal behavior is. In this case, the security event should be processed first.

According to the method in the example embodiments of the present application, the first security event is a security event belonging to at least a security level of the plurality of security levels. When correlated security events are searched, highly suspected security events of a plurality of security events can be searched to obtain related security events and causalities.

According to the method in the example embodiments of the present application, collecting a plurality of security-related security events comprises collecting a plurality of security logs and aggregating the plurality of collected security logs into a security event. Security logs can come from different hardware or software platforms and a security event is formed by aggregating a plurality of similar or related security logs.

According to another aspect of the embodiments of the present application, a device for identifying security threats is provided. In an embodiment, the device comprises a collecting unit, used to collect a plurality of security-related security events, wherein each security event contains a plurality of fields; a searching unit, used to search one or more second security events related to the first security event from the plurality of security events according to one or more fields of the plurality of fields of the first security event for a first security event of the plurality of security events, wherein one or more second security events and the first security event form event graphs; a calculating unit, used to calculate the weights of the event graphs; a sorting unit, used to sort the event graphs according to the weights.

The device according to an embodiment of the present invention can provide a method of effectively monitoring the security in an operational environment to improve the security situation of the operational environment, and can also correlate security events into event graphs so as to identify security attacks or illegal behaviors in the operational environment and then to reduce the rate of false reports.

The device in the example embodiments of the present application further comprises a converting unit, used to convert each security event according to conversion rules so as to map a plurality of fields of each security event into one or more feature sets. Through these conversions, the fields of original security events can be processed in turn so as to make preparations for the step of searching associated events.

According to the device in the example embodiments of the present application, one or more feature sets contains context information. The plurality of fields before conversions contain no context information. The one or more feature sets after conversions performed according to conversion rules contain context information, however. The efficiency of searching associated events by use of context information is improved.

According to the device in the example embodiments of the present application, a subject-predicate-object relationship exists between a plurality of features sets. Therefore, the plurality of feature sets have expected relationships to facilitate the association of causalities of security events in the subsequent step.

According to the device in the example embodiments of the present application, the converting unit is further used to execute at least one of the following: directly using one or more fields as one or more feature sets, explaining one or more fields, and extracting a part of one or more fields as one or more feature sets. The conversion rules are applicable to security events containing fields of different types of information and can successfully convert these fields into a plurality of feature sets having the expected relationship.

According to the device in the example embodiments of the present application, the searching unit is further used to search one or more second security events related to the first security event by matching one or more features in one or more feature sets of the first security event with one or more features in one or more feature sets of the second security events. Each feature of the security events after the conversion can be used as a basis for searching correlated security events in the database, and these features represent the causalities between correlated security events.

According to the device in the example embodiments of the present application, the searching unit is further used to search one or more cause events triggering the first security event and one or more result events triggered by the first security event. Correlated events having causalities among a plurality of security events are linked together, and the searched cause events and result events and the first security event form a sequence of correlated security events or an event graph.

According to the device in the example embodiments of the present application, features include time information, subject information and object information. Among the previous or later security events, the security events which have causalities can be determined according to the information.

According to the device in the example embodiments of the present application, the calculating unit is further used to preset a plurality of security levels, wherein each security event belongs to a security level of the plurality of security levels and a weight is assigned to each security level in order to calculate the weights of the event graphs according to the weights of the security levels of the plurality of security events. The weight of an event graph depends on the security levels of correlated security events. The larger the weights of the security levels of correlated security events are, the larger the weights of event graphs are.

According to the device in the example embodiments of the present application, the calculating unit is further used to calculate the weights of event graphs according to the weights of the security levels of one or more second security events. The weight of an event graph depends on the weights of the security levels of the cause event and the result event, that is to say, the larger the weights of the correlated cause event and result event are, the larger the weight of the event graph is. The larger the weight of the event graph is, the higher the probability of a security event being an attack or illegal behavior is. In this case, the security event should be processed first.

According to the device in the example embodiments of the present application, the first security event is a security event belonging to at least a security level of the plurality of security levels. When correlated security events are searched, highly suspected security events of a plurality of security events can be searched to obtain related security events and causalities.

According to the device in the example embodiments of the present application, the collecting unit is further used to collect a plurality of security logs and aggregating the plurality of collected security logs into a security event. Security logs can come from different hardware or software platforms and then the aggregating unit aggregates a plurality of similar or related security logs into a security event.

According to a further aspect of the present application, a storage medium is provided and is characterized in that the storage medium contains a stored program, wherein the program controls the execution of an embodiment of the above-mentioned method by the equipment where the storage medium is located when the program is run.

According to a fourth aspect of the present application, a processor is provided and is characterized in that the processor is used to run a program, wherein the program executes an embodiment of the above-mentioned method when the program is run.

According to a fifth aspect of the present application, a terminal is provided and the terminal comprises one or more processors, a storage and one or more programs, wherein one or more programs are stored in the storage and are configured to be executed by one or more processors, and one or more programs execute an embodiment of the above-mentioned method.

According to a sixth aspect of the present application, a computer program product is provided, the computer program product is tangibly stored in a computer readable medium and comprises computer executable instructions, and at least one processor executes an embodiment of the above-mentioned method when computer executable instructions are executed.

To let those skilled in the art better understand the technical solutions of the present invention, the following will clearly and completely describe the technical solutions in the embodiments of the present invention in combination with the drawings in the embodiments of the present invention. Obviously, the embodiments described are only a part, but not all of the embodiments of the present invention. All other solutions obtained by those skilled in the art on the basis of the embodiments of the present invention without any creative work should fall within the scope of protection of the present invention.

It should be noted that the terms "first" and "second" in the description, claims and the drawings are used to distinguish between similar objects, but not necessarily used to describe a specific order or sequence. It should be understood that the data used in such a way can be interchanged in a proper case so that the described embodiments of the present invention can be implemented in an order other than shown or described here. In addition, the terms "comprise" and "have" and their variants are intended to cover non-exclusive inclusions. For example, the process or method comprising a series of steps, or device, product or equipment comprising a series of units are unnecessarily limited to those clearly listed steps or units, but can comprise other steps or units which are not clearly listed or are intrinsic to the process, method, product or equipment.

FIG. 1 shows the flowchart of the method for identifying security threats according to the embodiments of the present invention. The method for identifying security threats according to the embodiments of the present invention comprises:

Step S101: Collect a plurality of security-related security events, wherein each security event contains a plurality of fields. In the embodiments of the present application, security events contain different fields and the fields includes but are not limited to time stamp, host name, IP address, action, state, and file name or process name. Each security event corresponds to an important security activity which has happened. Each security event has a behavior source performing an action on an object or target.

Step S103: For a first security event of the plurality of security events, search one or more second security events related to the first security event from the plurality of security events according to one or more fields of the plurality of fields of the first security event, wherein one or more second security events and the first security event form event graphs. Among the collected security events, linked or correlated security events are determined. These security events are not isolated or random events. In addition, the security events which are obtained through searches and are linked to each other constitute a real attack or illegal behavior. The method according to the embodiments of the present application will link the correlated security events to constitute an event chain or behavior chain. The security events obtained through searches will be added to linked security events. The search process is repeated until no new event is correlated into the current event graph.

Step S105: Calculate the weights of event graphs. For example, a preset correlation function is used to calculate the weights of the relationships of potential correlated events so as to obtain the weights of the event graphs formed by associated events and distinguish between a plurality of event graphs in terms of weights. For example, if the number of linked security events is large, and the weights of the relationships between linked security events or event linkages are large, the weights of event graphs may be large, and the probability of these security events being isolated security events or random security events (namely, the rate of false reports) is low.

Step S107: Sort the event graphs according to the weights. Event graphs with different weights will be shown to a professional or security engineer according to different priorities. Therefore, these event graphs will be processed according to the preset priorities. For example, the event graph with the highest priority is first processed. The security engineers and analysts who deal with and monitor security events of operation events can easily decide to process the event graph with a higher weight because the collection of security events in the event graph makes the possibility of false alarms lower.

Figure 2:
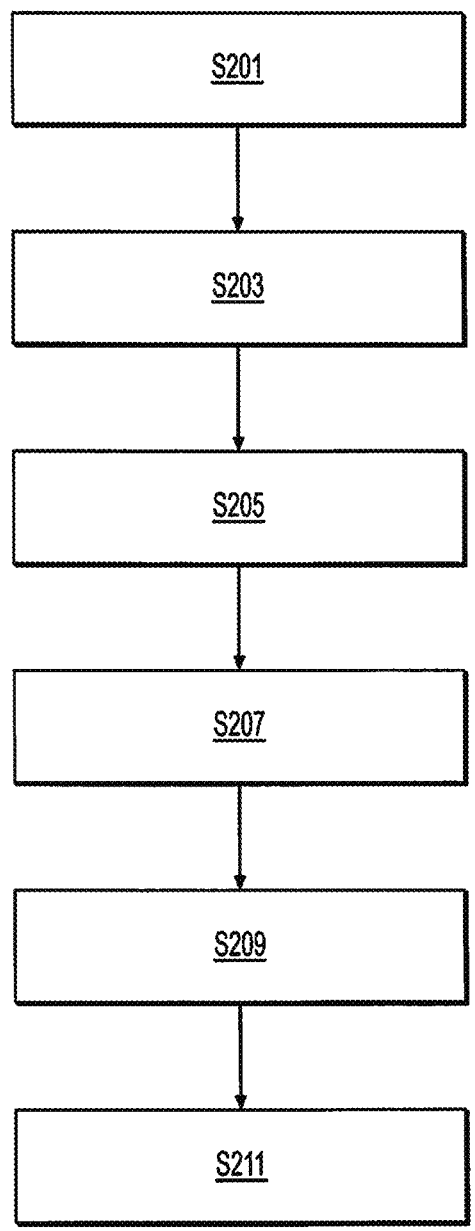
FIG. 2 shows the flowchart of the method for identifying security threats according to an example embodiment of the present invention.

FIG. 2 shows the flowchart of the method for identifying security threats according to an example embodiment of the present invention. As shown in FIG. 2, in step S201, a plurality of security logs are collected and the plurality of collected security logs are aggregated into a security event. For original security logs, for example, Windows event log and syslog of firewalls, network switches, routers or other sources, similar or related security logs are aggregated into a security event in an intuitive manner. For example, a port scanning event can be aggregated from thousands of security logs generated because of the access to different ports of a host. The aggregation rules include but are not limited to different scans, resource enumeration, account violence and denial of service (DoS). In the present embodiment, Windows event logs of workstations (including operator workstations, engineer workstations and other Windows servers) are collected by log collectors, including but not limited to ArcSight SmartConnector, McAfee Receiver, or open-source Logstash. Logs are in the common executable format (CEF). Windows event logs to be processed and associated in the present embodiment include but are not limited to host login, directory service status, host logout, domain login, administrator login, network login, process status, object access status, authentication, service status, login, application status, database, auditing status, user account, security policy status, policy, account change, password change/resetting, account unlocking, system configuration, system status, account deletion/closing, account creation/enabling, priority change, non-administrator, log status, file status, other application events, accounting locking, administrative log, firewall rules/access control list (ACL) and DoS. Therefore, in the present embodiment, the prior method (for example, the method provided by SIEM) can be used to aggregate similar or related Windows security logs into security events. Events include but are not limited to a successive login attempt failure (from the same source to the same target host), a sequential-port connection attempt and a sequential file/directory access.

In step S203, each security event is converted according to conversion rules so that the plurality of fields of each security event is mapped into one or more feature sets. In the present embodiment, the transformation configuration file in the YAML format is adopted to construct a subject-predicate-object relationship. The original fields of a security event are mapped into, for example, a context information containing subject-predicate-object relationship as shown below and the subject-predicate-object relationship is used for causalities: <source, action, target> between security events in subsequent steps, that is to say, each security event has a subject serving as a behavior source performing an action on an object or target. For example, but not limited to this, the source IP address accesses a specific port of another IP address. To convert security events (fields) and construct the context of the subject-predicate-object relationship, the transformation configuration in the mapping rules defined below can be adopted:

Directly map the fields of an event into the features of a source, target or behavior, for example, mapped_field: original_field Wherein, "original_field" is a field name in an original CEF event log, and "mapped_field" is a new field name after the conversion. If the field name recorded in an original event matches the "original_field" mode during the processing, then the field value is added to the new field name defined by "mapped_field". In addition, a plurality of original fields are allowed to be mapped into the same mapped field (separated by semicolons).

Inform the conversion function of how to explain the fields of the event, for example, convert the time stamp field from the epoch format to the "year-month-day hour:minute:second" format. The conversion rule not only maps the field name, but also informs how to explain the fields of an event. For example, the mapping rule for time stamp is Time stamp: rt<"EPOCH">

It means that the original field "rt" is in the epoch format of the Linux system and needs to be converted from the epoch format to the ""year-month-day hour:minute:second".

Use a regular expression to extract a part of the fields of an original event as features of a source, destination or action. For example, the mapping rule is src_ip:ORIGINAL_DATA["^((2[0-4]\d[25[0-5]\[01] ?\d\d?)\){3}(2 [0-4]\d\25[0-5]\[01]?\d\d?)"]

It means that a regular expression is used to extract the IP address from ORIGINAL_DATA.

In the configuration, the fields recorded in an original event (log) are converted into a context information containing subject-predicate-object relationship by mapping original fields into fields with a prefix such as src_, act_ and dst_. The fields not defined in the configuration are mapped into "others" default fields. Based on these conversion rules, the fields of the original event can sequentially be processed and converted into new fields containing subject-predicate-object relationship context information and the new fields are used for subsequent recurrent causalities. A plurality of fields can be mapped into "source", "action" and "destination", and therefore, "source", "action" and "destination" respectively contain the corresponding feature sets. After steps S201 and S203, all security events will be stored in ElasticSearch in the <field with a prefix src_, field with a prefix act_, field with a prefix dst_, other fields> format and are searched based on different query conditions.

In the embodiments according to the present application, the above-mentioned execution sequence of steps S201 and S203 can be changed, that is to say, step S203 can be executed first, and then step S201 can be executed.

In step S205, a plurality of security levels are preset wherein each security event belongs to a security level of the plurality of security levels and a weight is assigned to each security level in order to calculate the weights of the event graphs according to the weights of the security levels of the plurality of security events. The weights of event graphs are calculated according to the weights of the security levels of one or more second security events. The first security event is a security event belonging to at least a security level of the plurality of security levels. In this step, after a security event conversion, the standard mode match and/or event correlation method (which can be configured from the SIEM) can be adopted to determine suspected events, for example, suspected security event, which can be resulted from a normal operation, illegal behavior or attack and is labeled as alarm. In the present embodiment, alarm events include but are not limited to a successive login failure and adding a new account.

determined attack event, which is triggered by an attack or illegal behavior and is labeled as warning. In the present embodiment, warning events include but are not limited to use of mimikatz, exploitation of loopholes and execution of malicious programs.

security events other than alarm or warning events. These security events are labeled as general events.

In the present embodiment, an initial weight is assigned to the type of each identified event, for example, 1 to a general event, 2 to an alarm event, and 4 to a warning event.

In step S207, one or more second security events related to the first security event are searched by matching one or more features in one or more feature sets of the first security event with one or more features in one or more feature sets of the second security events. One or more cause events triggering the first security event and one or more result events triggered by the first security event are searched. If more than two security events are linked together to form a tree structured event graph, then one or more features in the destination feature set of one security event are correlated with the features in the source feature set of a plurality of other security events, or one or more features in the source feature set of one security event are correlated with the features in the destination feature set of a plurality of other security events.

In this step, the linked security events will be correlated into an event graph based on the causal analysis. For example, for each security event whose security level is alarm or warning, the following correlation will be performed so as to identify the correlated event graph:

The security event is put into an event queue and all security events to be processed are stored in the queue.

The first security event is taken out of the queue.

For each source field (source feature) beginning with "src_" of the first security event, a second security event satisfying the following conditions is searched in the ElasticSearch database:

The time stamp of the second security event is earlier than the time stamp of the first security event, that is to say, the second security event happens before the first security event.

The value of the field ("src_") of the first security event is equal to or is apart of that of the destination field (beginning with "dst_") of the second security event.

Therefore, the second security event is the cause event triggering the first security event. In addition, a plurality of second security events which are the cause events of the first security event may exist. One pair or more pairs of linked security events are reserved as a part of the event graph and all correlated second security events are added to the event queue.

For each destination field beginning with "dst_" (namely, destination feature) of the first security event, a third security event satisfying the following conditions is searched in the ElasticSearch database:

The time stamp of the third security event is later than the time stamp of the first security event, that is to say, the third security event happens after the first security event.

The value of the field ("dst_") of the first security event is equal to or is a part of that of the source field (beginning with "src_") of the third security event.

Therefore, the third security event is the result event triggered by the first security event. In addition, a plurality of third security events which are the result events triggered by the first security event may exist. One pair or more pairs of linked security events are reserved as a part of the event graph and all correlated third security events are added to the event queue.

Steps S203 to S207 are repeated until the queue of the security events to be processed is empty. Finally, the security events in the event graph will be linked together.

In step S209, the weights of event graphs are calculated. In this step, the weights of correlated events of different event graphs are calculated. In the present embodiment, the following weighting function is adopted:

$$f(w_i, v) = \sum_{i=1}^{n} w_i \times v$$

For each causality pair, v is the weight of a result event and $w_i$ is the weight of a cause event. Since a plurality of cause events may exist, the sum is used to calculate the combined weight of the tree structured event graph.

For example, for the event pair of each causality (cause and result), the weight of the event pair can be calculated in the following way:

if the two security events in a candidate security event pair are both warning events, then the weight of the event pair is 4×4=16;

if one is a warning event and the other is an alarm event, the weight of the event pair is 4×2=8;

if one is a warning event and the other is a general event, the weight of the event pair is 4×1=4;

if the two security events are alarm events, the weight of the event pair is 2×2=4;

if one is an alarm event and the other is a general event, the weight of the event pair is 2×1=2;

if the two security events are general events, the weight of the event pair is 1×1=1.

In the embodiments of the present application, event paths or event graphs with a low weight can be removed by presetting a threshold. If the weight obtained from calculations is less than the first threshold, then security events will not be correlated so as to reduce the amount of calculations. For example, if the combined weight is less than the threshold, the sub-graph is skipped, or not correlated. If the threshold is equal to 2, then a sub-graph containing at least an alarm or warning security event is combined into a larger event graph and normal security events are prevented from being linked into a larger event graph so as to avoid false reports.

In step S211, event graphs are sorted according to the weights of the event graphs. In this step, an event graph with a larger weight will be processed first. Therefore, security engineers or security analysts can more easily decide to process the event graph with a high weight because the possibility of the security events in the event graph being reported falsely is much lower.

Figure 3:
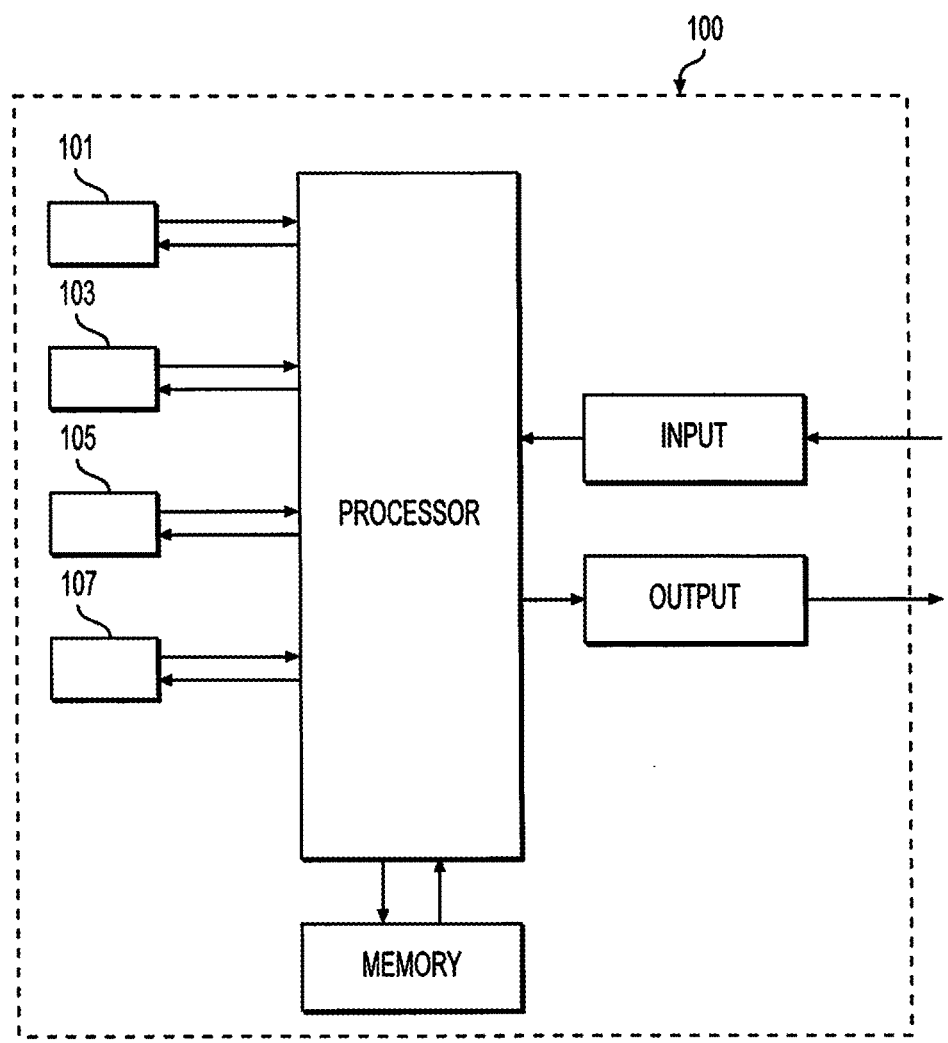
FIG. 3 shows the structure of the device for identifying security threats according to the embodiments of the present invention.

FIG. 3 shows the structure of the device for identifying security threats according to the embodiments of the present invention. As shown in FIG. 3, the device 100 comprises a collecting unit 101, which collects a plurality of security-related security events, wherein each security event contains a plurality of fields, a searching unit 103, which searches one or more second security events related to a first security event from the plurality of security events according to one or more fields of the plurality of fields of the first security event for the first security event of the plurality of security events, wherein one or more second security events and the first security event form event graphs, a calculating unit 105, which calculates the weights of the event graphs, and a sorting unit 107, which sorts the event graphs according to the weights. The device 100 described in FIG. 3 and the units in the device execute the method for identifying security threats in FIG. 1. Here, the execution of the method is not described again.

Figure 4:
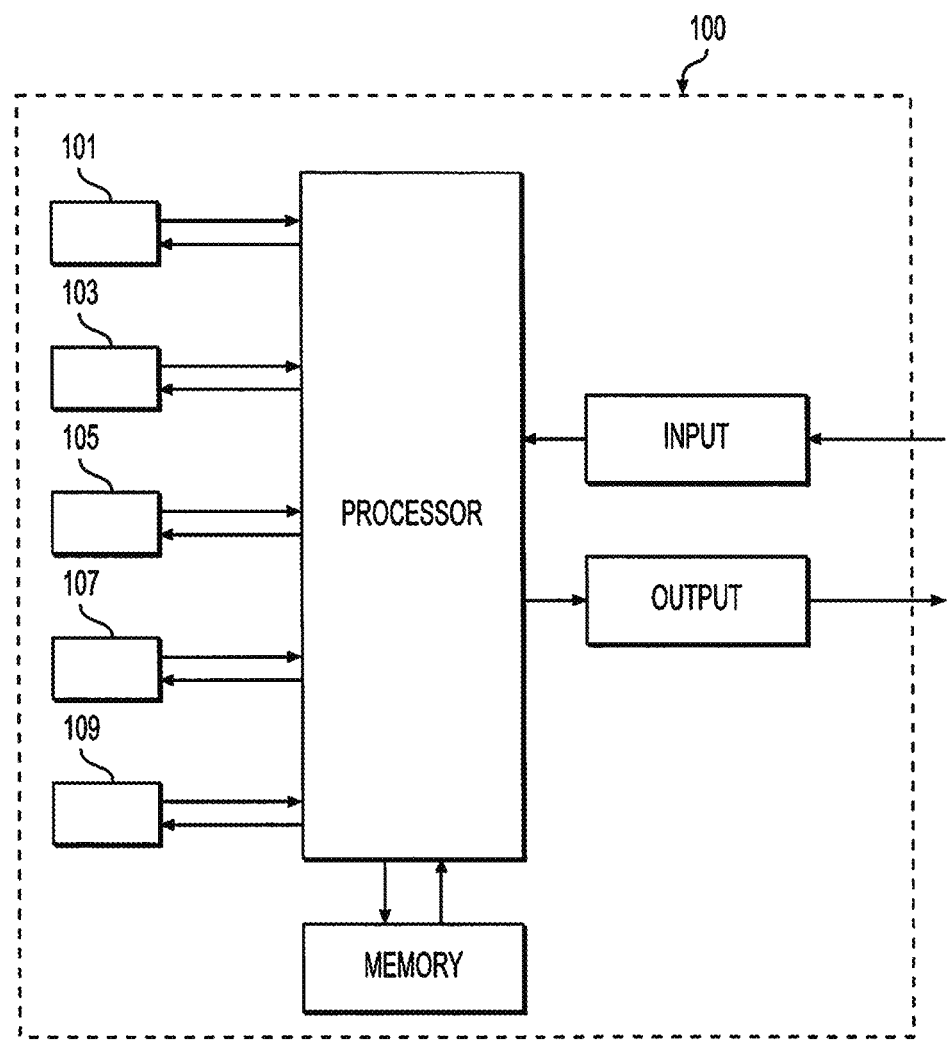
FIG. 4 shows the structure of the device for identifying security threats according to an example embodiment of the present invention.

FIG. 4 shows the structure of the device for identifying security threats according to an example embodiment of the present invention. Compared with the device 100 shown in FIG. 3, the device 100 in FIG. 4 further comprises a converting unit 109, which converts each security event according to conversion rules so as to map a plurality of fields of each security event into one or more feature sets. In addition, the converting unit 109 is further used to execute at least one of the following: directly using one or more fields as one or more feature sets, explaining one or more fields, and extracting a part of one or more fields as one or more feature sets. In the example embodiment shown in FIG. 4, the searching unit 103 is further used to search one or more cause events triggering the first security event and one or more result events triggered by the first security event. The calculating unit 105 is further used to preset a plurality of security levels, wherein each security event belongs to a security level of the plurality of security levels and a weight is assigned to each security level in order to calculate the weights of the event graphs according to the weights of the security levels of the plurality of security events. The device 100 described in FIG. 4 and the units in the device execute the method for identifying security threats in FIG. 2. Here, the execution of the method is not described again.

According to another embodiment of the present application, a storage medium is provided and the storage medium contains a stored program, wherein the program controls the execution of the above-mentioned method for identifying security threats by the equipment where the storage medium is located when the program is run.

According to a further embodiment of the present application, a processor is provided and the processor is used to run a program, wherein the program executes the above-mentioned method for identifying security threats when the program is run.

According to a fourth embodiment of the present application, a terminal is provided and the terminal comprises one or more processors, a storage and one or more programs, wherein one or more programs are stored in the storage and are configured to be executed by one or more processors, and one or more programs execute the above-mentioned method for identifying security threats.

According to a fifth embodiment of the present application, a computer program product is provided, the computer program product is tangibly stored in a computer readable medium and comprises computer executable instructions, and at least one processor executes the above-mentioned method for identifying security threats when computer executable instructions are executed.

It should be understood that the technical content disclosed in the embodiments of the present application can be realized in other ways. The above-described embodiments of the device are given only for the example purpose. The division of units or modules is only a logical function division, and other division methods can be used in the actual realization. For example, a plurality of units or modules or components can be combined or integrated into another system, or some features can be ignored or cannot be executed. In addition, the shown or discussed couplings, or direct couplings or communication connections between them can be indirect couplings or communication connections, electrical or otherwise, through some interfaces, modules or units.

The unit or module described as a separate part can be or cannot be physically separated, and the part shown as a unit or module can be or cannot be a physical unit or module, that is to say, it can be located at one place or can be distributed to a plurality of network units or modules. Part or all of the units or modules can be selected to realize the solutions of the embodiments according to the actual requirement.

In addition, the functional units or modules in each embodiment of the present application can be integrated into a processing unit or module, or each unit or module physically exists separately, or two or more units or modules are integrated into a unit or module. The above-mentioned integrated unit or module can be realized in the form of hardware or in the form of a software functional unit or module.

The integrated unit can be stored in a computer-accessible storage medium if it is realized in the form of a software functional unit and is marketed or used as an independent product. Based on such an understanding, the technical solutions of the present application or the part which makes contributions to the prior art, or all or part of the technical solutions can essentially be embodied in the form of a software product, and the computer software product is stored in a storage medium and comprises a plurality of instructions to enable a computer (PC, server or network equipment) to execute all or part of the steps of the method described in the embodiments of the present application. The previously-mentioned storage medium include USB disk, read-only memory (ROM), random access memory (RAM), mobile hard disk, magnetic disk or compact disc and other various media which can store program codes.

Only preferred embodiments of the present application are described above. It should be noted that those skilled in the art can make improvements and modifications without departing from the principle of the present application and these improvements and modifications should also fall within the scope of protection of the present application.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for identifying a security threat in a computer driven operational environment based on interactions between machines, the method comprising:
   detecting at least one security-related event occurring in the operational environment;
   collecting a plurality of security-related security events, wherein each security event of the plurality of security-related security events, contains a plurality of fields;
   removing random events by determining a relationship among linked security events by searching, for a first security event of the plurality of security-related security events, one or more second security events related to the first security event from the plurality of security-related security events according to one or more fields of the plurality of fields of the first security event, wherein the one or more second security events and the first security event, form event graphs, and the searching is performed until no new event is correlated into an event graph;

calculating weights of the event graphs;

sorting the event graphs according to the weights calculated; and determining a security threat to the operational environment based on the weighted event graphs of the linked security events thereby reducing a rate of false security threat reports, wherein searching of the one or more second security events related to the first security event includes searching one or more cause events triggering the first security event and one or more result events triggered by the first security event, wherein the calculating of the weights of the event graphs includes presetting a plurality of security levels, wherein each security event, plurality of security-related security events, belongs to a security level of the plurality of security levels and wherein a respective weight is assigned to each respective security level of the plurality of security levels for the calculating of the weights of the event graphs according to the respective weights assigned to the respective security levels of the plurality of security events.

2. The method of claim 1, further comprising:

converting each security event, of the plurality of security-related security events, according to conversion rules so as to map a plurality of fields of each security event into one or more feature sets.

3. The method of claim 2, wherein the conversion rules contain at least one of:

directly using one or more fields as the one or more feature sets, explaining one or more fields, and extracting a part of one or more fields as the one or more feature sets.

4. The method of claim 2, wherein the searching of the one or more second security events related to the first security event comprises:

searching one or more second security events related to the first security event by matching one or more features in the one or more feature sets of the first security event with one or more features in the one or more feature sets of the one or more second security events.

5. The method of claim 1, wherein the collecting of the plurality of security-related security events comprises:

collecting a plurality of security logs and aggregating the plurality of security logs collected into a security event.

6. A non-transitory storage medium, storing a stored program, the program, when run on equipment where the non-transitory storage medium is located including at least one processor, configuring the at least one processor to control execution of a method for identifying a security threat in a computer driven operational environment based on interactions between the equipment where the non-transitory storage medium is located, the method comprising:

detecting at least one security-related event occurring in the operational environment;

collecting a plurality of security-related security events, wherein each security event of the plurality of security-related security events, contains a plurality of fields;

removing random events by determining a relationship among linked security events by searching, for a first security event of the plurality of security-related security events, one or more second security events related to the first security event from the plurality of security-related security events according to one or more fields of the plurality of fields of the first security event, wherein the one or more second security events and the first security event form event graphs, and the searching is performed until no new event is correlated into an event graph;

calculating weights of the event graphs;

sorting the event graphs according to the weights calculated; and determining a security threat to the operational environment thereby reducing a rate of false security threat reports, wherein searching of the one or more second security events related to the first security event includes searching one or more cause events triggering the first security event and one or more result events triggered by the first security event, wherein the calculating of the weights of the event graphs includes presetting a plurality of security levels, wherein each security event, plurality of security-related security events, belongs to a security level of the plurality of security levels and wherein a respective weight is assigned to each respective security level of the plurality of security levels for the calculating of the weights of the event graphs according to the respective weights assigned to the respective security levels of the plurality of security events.

7. The non-transitory storage medium of claim 6, wherein when the program is run on the equipment where the storage medium is located, the program configures at least one processor of the equipment to control execution of the method, the method further comprising:

converting each security event, of the plurality of security-related security events, according to conversion rules so as to map a plurality of fields of each security event into one or more feature sets.

8. The non-transitory storage medium of claim 7, wherein the conversion rules contain at least one of:

directly using one or more fields as the one or more feature sets, explaining one or more fields, and extracting a part of one or more fields as the one or more feature sets.

9. The non-transitory storage medium of claim 7, wherein when the program is run on the equipment where the storage medium is located, the program configures at least one processor of the equipment to control execution of the method, the searching includes:

searching one or more second security events related to the first security event by matching one or more features in the one or more feature sets of the first security event with one or more features in the one or more feature sets of the one or more second security events.

10. The non-transitory storage medium of claim 6, wherein the collecting comprises:

collecting a plurality of security logs and aggregating the plurality of security logs collected into a security event.

11. A terminal, comprising:

one or more processors;

a storage storing one or more programs, wherein the one or more programs are executable by the one or more processors, and once executed, the one or more programs configure the one or more processors to perform at least:

detecting at least one security-related event occurring in an operational environment;

collecting a plurality of security-related security events, wherein each security event of the plurality of security-related security events, contains a plurality of fields;

removing random events by determining a relationship among linked security events by searching, for a first security event of the plurality of security-related security events, one or more second security events related to the first security event from the plurality of security-related security events according to one or more fields of the plurality of fields of the first security event, wherein the one or more second security events and the first security event, form event graphs, and the searching is performed until no new event is correlated into an event graph;

calculating weights of the event graphs; and sorting the event graphs according to the weights calculated; and determining a security threat to an operational environment based on the sorted event graphs, wherein searching of the one or more second security events related to the first security event includes searching one or more cause events triggering the first security event and one or more result events triggered by the first security event, wherein the calculating of the weights of the event graphs includes presetting a plurality of security levels, wherein each security event, plurality of security-related security events, belongs to a security level of the plurality of security levels and wherein a respective weight is assigned to each respective security level of the plurality of security levels for the calculating of the weights of the event graphs according to the respective weights assigned to the respective security levels of the plurality of security events.

12. The terminal of claim 11, wherein the one or more programs, once executed, configure the one or more processors to further perform at least:

converting each security event, of the plurality of security-related security events, according to conversion rules so as to map a plurality of fields of each security event into one or more feature sets.

13. The terminal as claimed in claim 12, wherein the conversion rules contain at least one of:

directly using one or more fields as the one or more feature sets, explaining one or more fields, and extracting a part of one or more fields as the one or more feature sets.

14. The terminal of claim 12, wherein the one or more programs, once executed, configure the one or more processors to perform the searching, the searching further including searching one or more second security events related to the first security event by matching one or more features in the one or more feature sets of the first security event with one or more features in the one or more feature sets of the one or more second security events.

15. The terminal of claim 11, wherein the one or more programs, once executed, configure the one or more processors to further perform at least:

collecting a plurality of security logs and aggregating the plurality of collected security logs into a security event.

* * * * *